United States Patent
Huang

(10) Patent No.: US 11,485,564 B2
(45) Date of Patent: Nov. 1, 2022

(54) INFLATABLE BAG

(71) Applicant: SHIFANG PACKAGING MATERIAL CO., LIMITED, Huizhou (CN)

(72) Inventor: Yun-Dan Huang, Huizhou (CN)

(73) Assignee: SHIFANG PACKAGING MATERIAL CO., LIMITED, Guangdong (CN)

( * ) Notice: Subject to any disclaimer, the term of this patent is extended or adjusted under 35 U.S.C. 154(b) by 497 days.

(21) Appl. No.: 16/717,520

(22) Filed: Dec. 17, 2019

(65) Prior Publication Data

US 2021/0094749 A1   Apr. 1, 2021

(30) Foreign Application Priority Data

Sep. 27, 2019   (TW) ................. 108135246

(51) Int. Cl.
  *B65D 81/05* (2006.01)
  *F17C 13/00* (2006.01)

(52) U.S. Cl.
  CPC .......... *B65D 81/052* (2013.01); *F17C 13/002* (2013.01); *F17C 2201/058* (2013.01); *F17C 2205/032* (2013.01); *F17C 2221/013* (2013.01); *F17C 2270/0772* (2013.01)

(58) Field of Classification Search
  CPC .. B65D 81/052; B65D 33/008; A45C 7/0081; A45C 7/0077; F17C 7/00; F17C 13/002; F17C 13/06

USPC .............. 220/501, 919, 23.86, 23.83; 383/3; 206/522

See application file for complete search history.

(56) References Cited

U.S. PATENT DOCUMENTS

| | | | | |
|---|---|---|---|---|
| 3,730,240 | A * | 5/1973 | Presnick | B65D 81/3858 383/110 |
| 6,334,537 | B1 * | 1/2002 | Tepper | A45C 7/0081 383/3 |
| 7,300,206 | B2 * | 11/2007 | Fedeli | A45C 13/22 24/616 |
| 2010/0142862 | A1 * | 6/2010 | Sam | B65D 33/008 383/38 |
| 2020/0024059 | A1 * | 1/2020 | Wetsch | B65D 81/052 |
| 2020/0031085 | A1 * | 1/2020 | Baines | B31D 5/0073 |
| 2020/0198866 | A1 * | 6/2020 | Leiberman | B65D 81/052 |

* cited by examiner

*Primary Examiner* — Robert J Hicks
(74) *Attorney, Agent, or Firm* — Muncy, Geissler, Olds & Lowe, P.C.

(57) ABSTRACT

An inflatable bag includes a gas cylinder filled with a compressed gas and having a bottle mouth for discharging the compressed gas, a hole-piercing device pressable to pierce into the bottle mouth for letting the compressed gas be discharged out of the gas cylinder, an inner bag surrounding the gas cylinder and the hole-piercing device and having air holes for the passing of the discharged gas, and an inflatable outer bag surrounding the inner bag and inflatable by the gas that is discharged out of the gas cylinder and flows through the air holes of the inner bag. By the above configuration, the inflatable bag is placed in a box around the object to be protected and quickly inflated to form a filling buffer without generating heat, ensuring that the protected object is not easily deteriorated and facilitating recycling and cleaning.

7 Claims, 6 Drawing Sheets

INFLATABLE BAG

This application claims the priority benefit of Taiwan patent application number 108135246, filed on Sep. 27, 2019.

BACKGROUND OF THE INVENTION

1. Field of the Invention

The present invention relates to inflatable bags and more particularly, to such an inflatable bag for use in a box to protect an object, which can be quickly inflated to form a filling buffer without generating heat, ensuring that the protected object is not easily deteriorated and facilitating recycling and cleaning.

2. Description of the Related Art

When items are to be carried or transported after being packed, they are prone to accidental touches or throws during manual handling, especially in the transport of fragile items such as glass bottles, porcelain or computer components, local or total damage may be caused by vibration and collision. In order to maintain the integrity of the easily-fractured objects during storage and transportation, it is necessary to place a filling buffer around the objects contained in the box to achieve shockproof and protect the integrity thereof.

Nowadays, the technology for rapidly manufacturing the filling buffer is to use the solid material generated by the mixing and expansion of the chemical materials A and B to fill the gap around the easily broken object, so as to fix and protect the easily broken object without damage. However, the use of a filling buffer formed by the mixing and expansion of the chemical materials A and B will generate heat in the process of mixing and expansion, which may further affect the deterioration of the fragile items (for example, the deterioration of the wine in the wine bottle). Further, chemically produced filling buffers have a large increase in volume after expansion, which adversely affects recycling and cleaning operations and environmental problems. Those who want to form in this industry need to redesign the filling buffer structure to effectively solve the aforesaid problem..

SUMMARY OF THE INVENTION

The present invention has been accomplished under the circumstances in view. It is therefore the main object of the present invention to provide an inflatable bag, which comprises a gas cylinder filled with a compressed gas and having a bottle mouth for discharging the compressed gas, a hole-piercing device pressable to pierce into the bottle mouth for letting the compressed gas be discharged out of the gas cylinder, an inner bag surrounding the gas cylinder and the hole-piercing device and having air holes for the passing of the discharged gas, and an inflatable outer bag surrounding the inner bag and inflatable by the gas that is discharged out of the gas cylinder and flows through the air holes of the inner bag. By the above configuration, the inflatable bag is placed in a box around the object to be protected and quickly inflated to form a filling buffer without generating heat, ensuring that the protected object is not easily deteriorated and facilitating recycling and cleaning.

Preferably, the hole-piercing device comprises a bottle cap and a thumbtack. The bottle cap covers the bottle neck of the gas cylinder, comprising a housing space for receiving the bottle neck and a positioning hole located on a top wall thereof and disposed in communication with the housing space. The thumbtack is mounted in the positioning hole of the bottle cap and aimed at the bottle mouth of the gas cylinder.

Preferably, the inflatable outer bag comprises a. plurality of division lines formed by high frequency heat sealing, a plurality of air chambers separated from one another by the division lines, and a plurality of airflow passages set between the air chambers.

Preferably, the compressed gas of the gas cylinder is composed of 24 grams of carbon dioxide ($CO_2$).

Preferably, the length and width of the inner bag are 200 mm*80 mm, and the number of the at least one air hole is 14 that are arranged in an array of 2*7 on the inner bag and have a diameteranging from 0.5 to 1.5 mm.

Preferably, the inner bag is composed of a composite material of polyethylene terephthalate and polyethylene with a thickness of 0.22 mm.

Preferably, the inflatable outer bag is composed of a nylon coextruded film with a thickness of 0.15 mm. Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
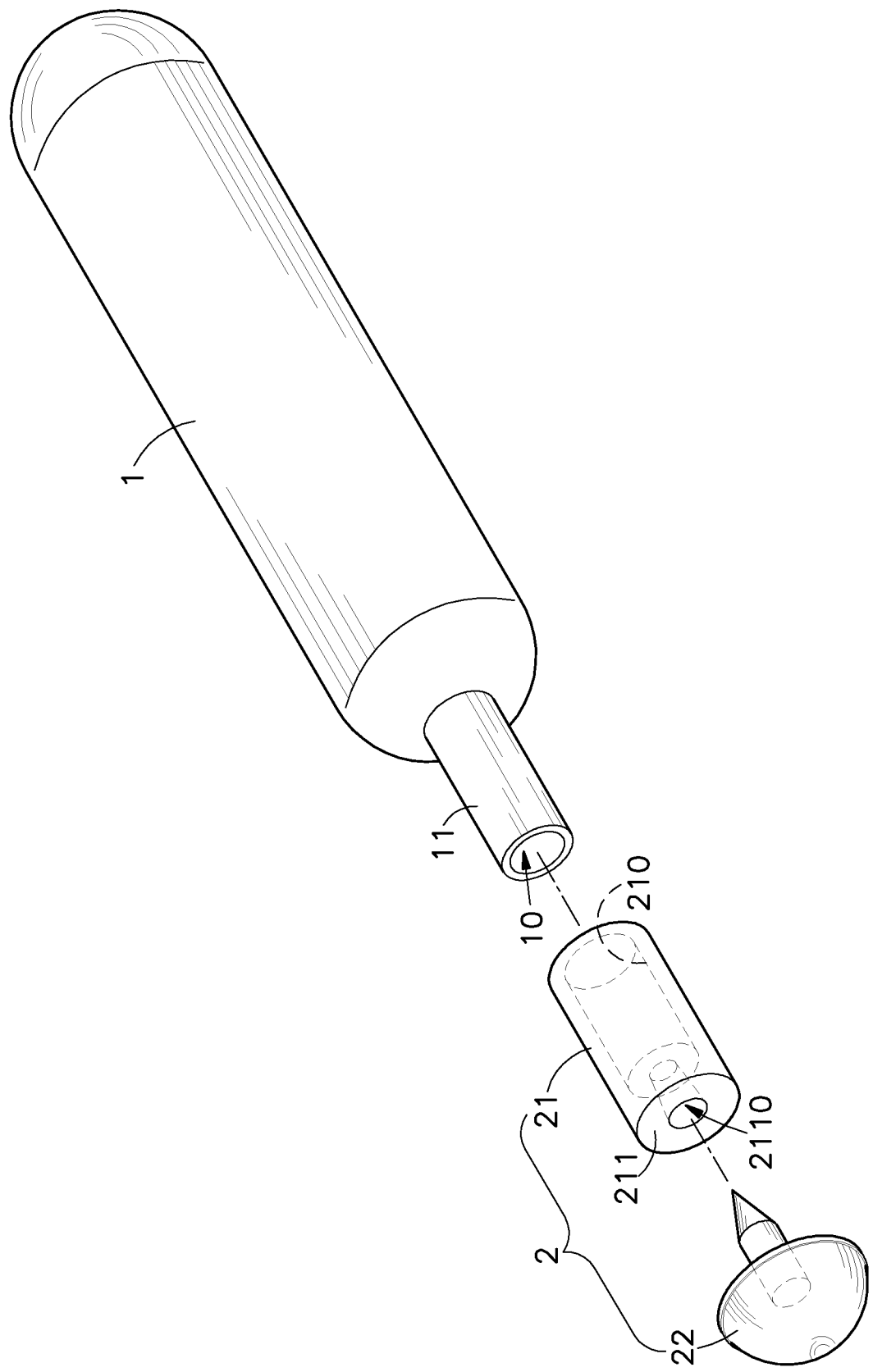
FIG. 1 is an exploded view of a gas cylinder and a hole-piercing device of an inflatable bag in accordance with the present invention.

Referring to FIGS 1-5, an inflatable bag generally comprises a gas cylinder 1, a hole-piercing device 2, an inner bag and an inflatable outer bag 4.

The gas cylinder 1 stores therein a compressed gas and has a bottle neck 11 with a bottle mouth 10 for discharging the compressed gas. A film (not shown) is disposed in the bottle mouth 10 to make the gas cylinder 1 sealed. The film is a member for sealing and preventing gas leakage after the gas cylinder 1 is filled with the compressed gas, and is included in the conventional art, so it is not described here. The compressed gas may be composed of 24 grams (g) of carbon dioxide ($CO_2$).

The hole-piercing device 2 is mounted on the bottle mouth 10 of the gas cylinder 1. The hole-piercing device 2 comprises a bottle cap 21 that covers the bottle neck 11 of the gas cylinder 1 and defines therein a housing space 210 for receiving the bottle neck 11 of the gas cylinder 1, and a thumbtack 22 inserted into a positioning hole 2110 on a top wall 211 of the bottle cap 21. The positioning hole 2110 and the housing space 210 are in an interconnected state.

The inner bag 3 surrounds the gas cylinder 1 and the hole-piercing device 2. The inner bag 3 is provided at least one air hole 30 for gas discharge, and the number of the at least one air hole 30 in the present preferred embodiment is plural. Of course, the smaller the number of air holes 30, the larger the aperture of the air holes 30 is, in order to cope with the gas flowing from the gas cylinder 1. Conversely, the more air holes 30 are set, the smaller the aperture of the air holes 30 can be, which can cope with the gas flowing from gas cylinder 1. The aperture size of the above air holes 30 needs to be designed according to the calculation formula of fluid chanics, so that the inner bag 3 will not burst due to too much gas flowing out of the gas cylinder 1 instantaneously, and the calculation formula of the fluid mechanics is not a technical feature of the present invention, so it is not disclosed here.

Figure 2:
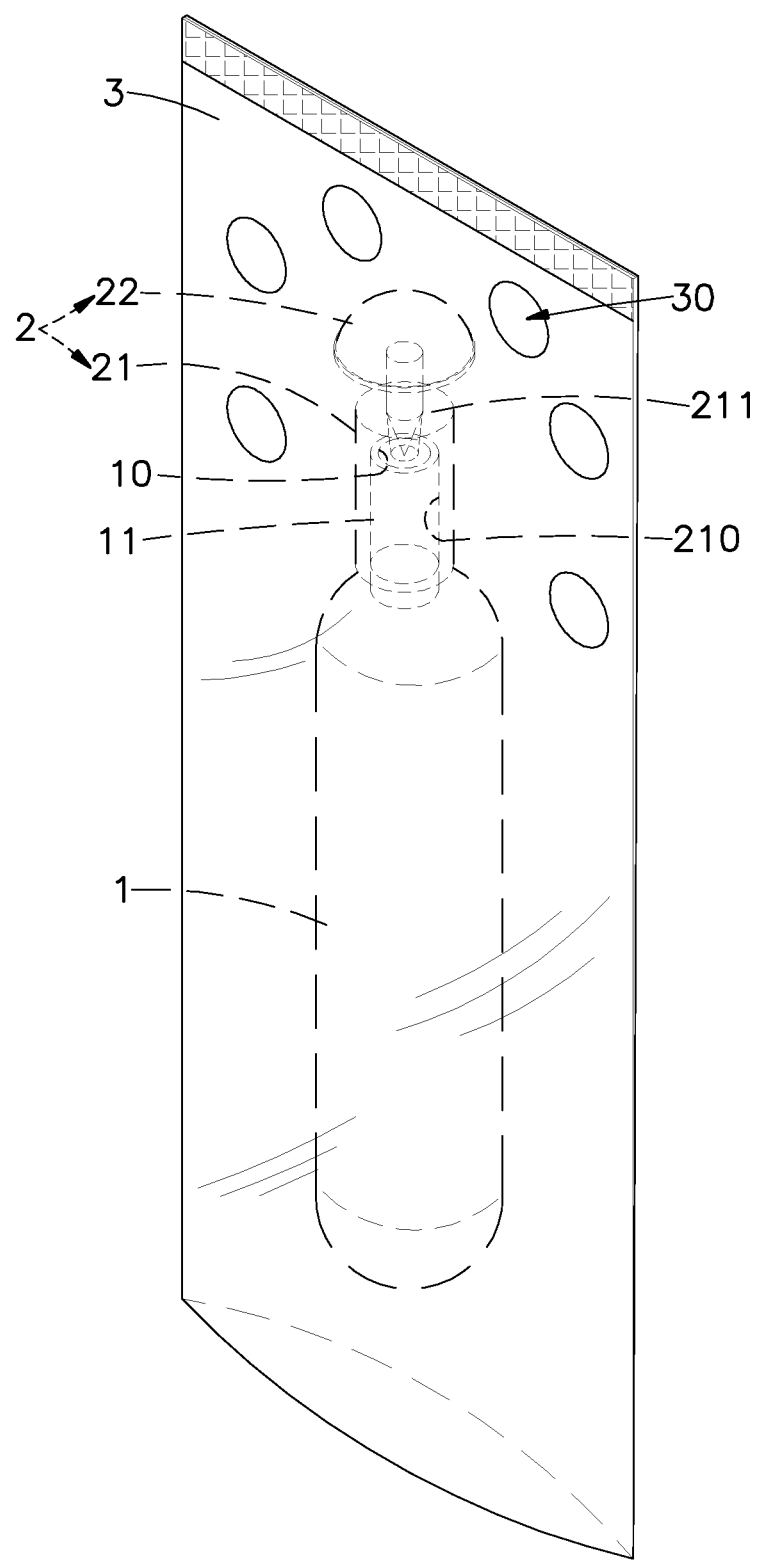
FIG. 2 rs a schematic drawing of the present invention, showing the gas cylinder placed in the inner bag.

The length and width of the inner bag 3 are 200 mm*80 mm (square mm), and the plurality of air holes 30 can be set to be fourteen (not shown) in addition to the six disclosed in FIG. 2. These air holes 30 are arranged in an array of 2*7 on the inner bag 3. The air holes 30 have a diameter ranging from 0.5 to 1.5 mm, but the preferred embodiment is 1 mm. If an average of 14 air holes 30 are required on the inner bag 3, the air hole 30 is set in the calculation formula of 16,000 square centimeters/14 air holes=1142.8 square millimeters, that is the optimized arrangement of the air holes 30 on the inner bag 3. The inner bag 3 is composed of a composite material of polyethylene terephthalate (PET and polyethylene (PE) having a thickness of 0.22 mm (millimeter).

The inflatable outer bag 4 is mounted to surround the inner bag 3 and inflated by the gas flowing from the gas cylinder 1. through the air holes 30 of the inner bag 3. The inflatable outer bag 4 is composed of a plurality of air chambers (namely, the first air chamber 41, the second air chamber 42, the third air chamber 43 and the fourth air chamber 44) and a plurality of airflow passages (namely, the first airflow passage 410, the second airflow passage 420 and the third airflow passage 430) set between the air chambers 41~44, and the partition structure of the air chambers 41~44 of the inflatable outer bag 4 is formed by a plurality of high frequency heat sealing dividing lines 45. Of course, those skilled in the art can also install the inner bag 3 with the gas cylinder 1 into the inflatable outer bag 4 having only a single air chamber, so the number of air chamber, airflow passage and division line can be freely configured and not limited by the structure disclosed in FIGS. 3-5. The inflatable outer bag 4 is composed of a nylon coextruded film (PA and PE) with a thickness of 0.15 mm (millimeter). According to the design of the inner bag 3, the inflatable outer bag 4 and the plurality of air holes 30, the inflation time of the gas flowing from the gas cylinder 1 can be controlled to fully inflate the inflatable outer bag 4 within 20~60 seconds, and this inflation time is sufficient to form a filling buffer that matches the space around the protected object (not shown) in the box (not shown), maintaining the smoothness of the packaging operation.

Figure 6:
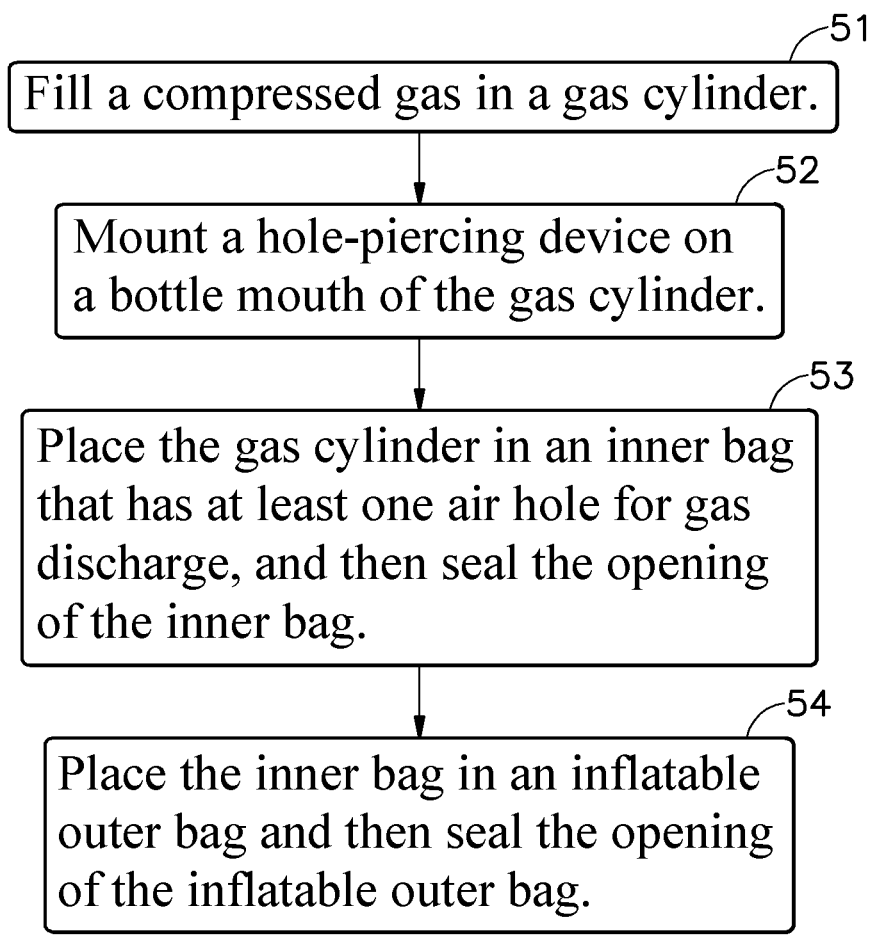
FIG. 6 is a flow chart of the method for manufacturing the inflatable bag of the present invention.

Referring to FIG. 6, the method for manufacturing the inflatable bag of the present invention includes the steps as follows:

Step 51: Fill a compressed gas in a gas cylinder.

Step 52: Mount a hole-piercing device on a bottle mouth of a gas cylinder. The hole-piercing device comprises a bottle cap, which is capped on a bottle neck of the gas cylinder and has a housing space defined therein for receiving the bottle neck, and a thumbtack mounted in a positioning hole on a top wall of the bottle cap.

Step 53: Place the gas cylinder in an inner bag that has at least one air hole for gas discharge, and then seal the opening of the inner bag.

Step 54: Place the inner bag in an inflatable outer bag and then seal the opening of the inflatable outer bag. The inflatable outer bag has a plurality of air chambers and a plurality of airflow passages in communication between the air chambers. The separation structure of the air chambers of the inflatable outer bag is composed of a plurality of division lines heated by high frequency.

Figure 3:
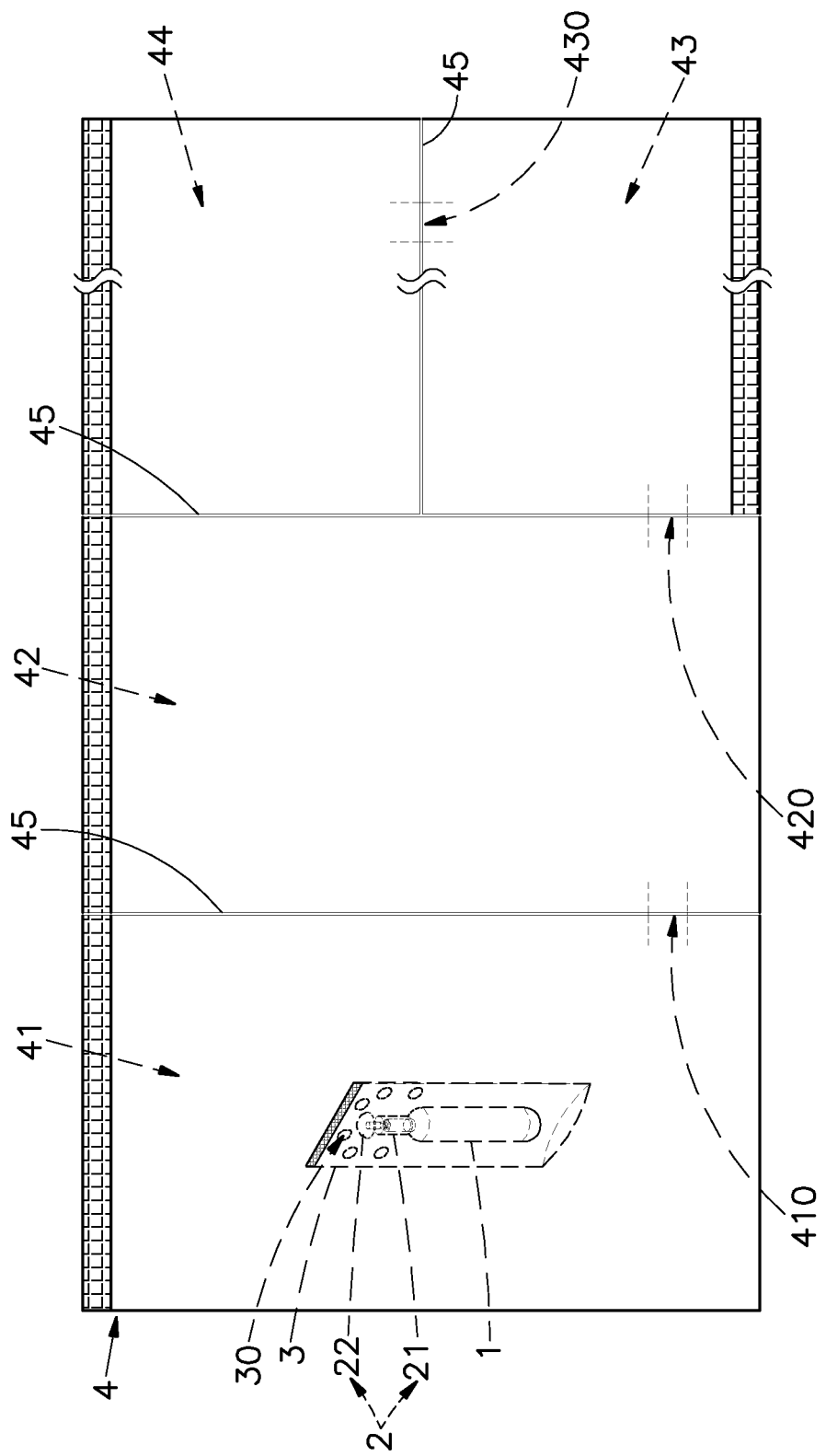
FIG. 3 is a schematic applied view of the inflatable bag in accordance with the present invention (I).
Figure 4:
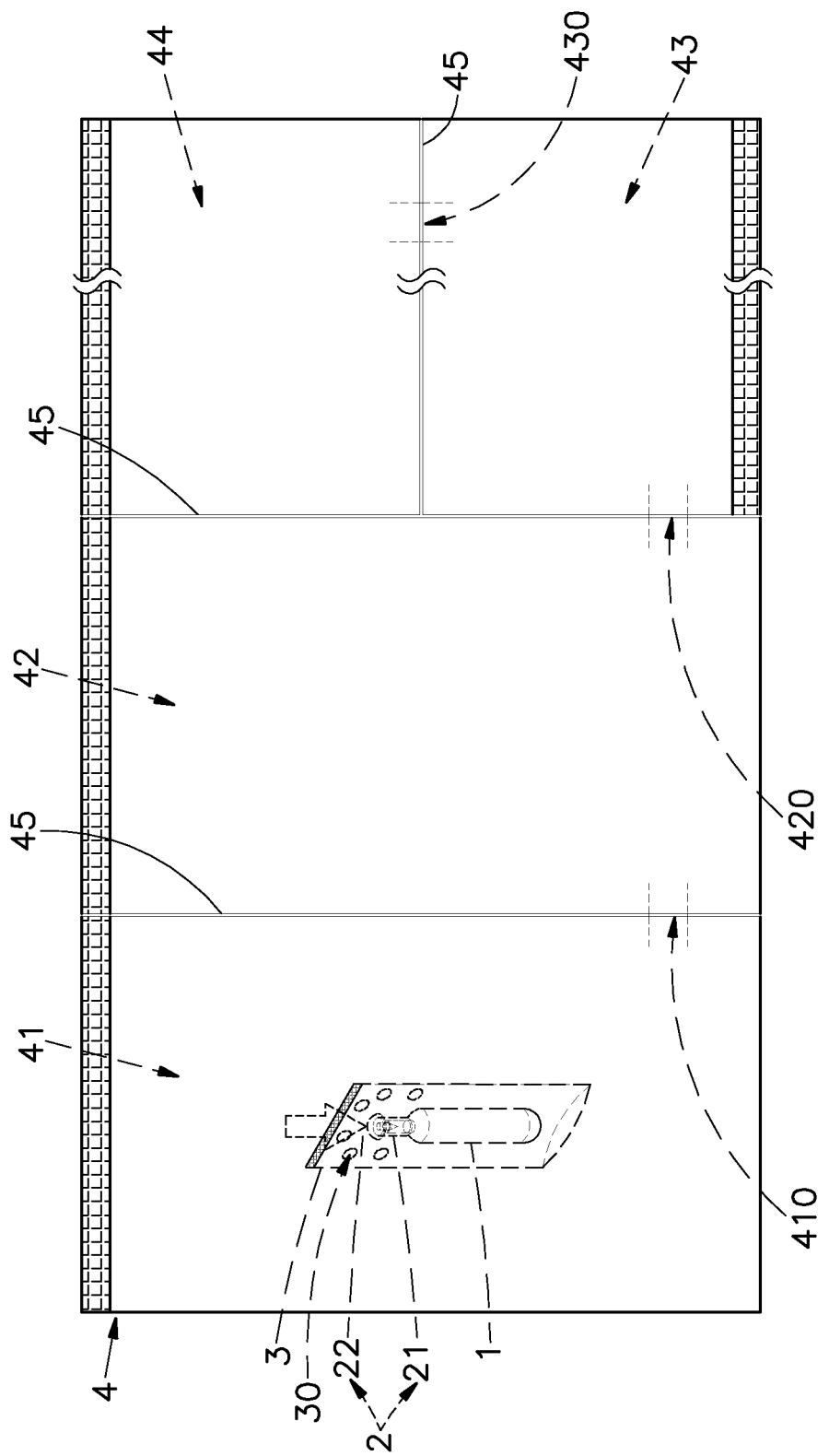
FIG. 4 is a schematic applied view of the inflatable bag in accordance with the present invention (II).
Figure 5:
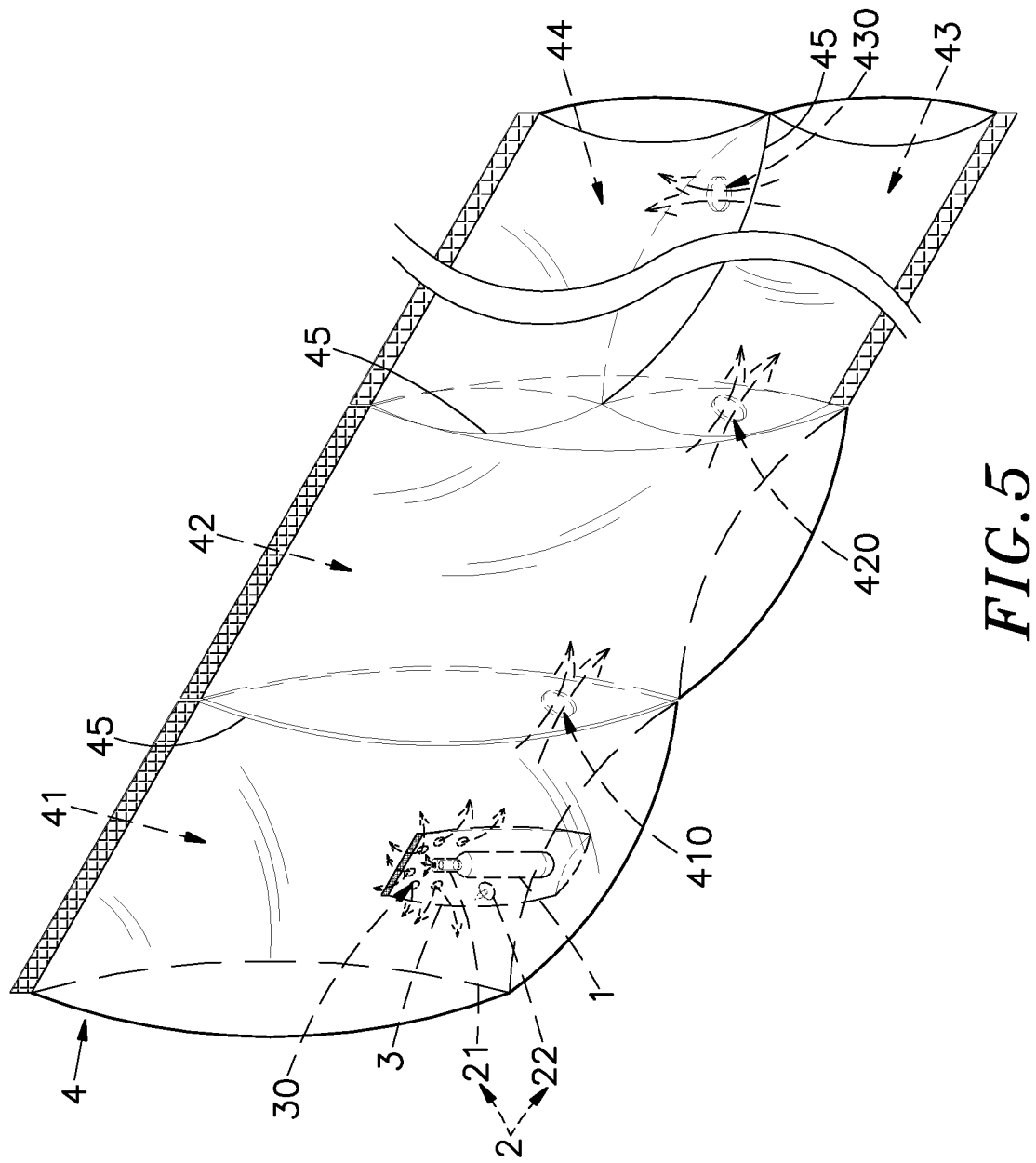
FIG. 5 is a schematic applied view of the inflatable bag in accordance with the present invention (III).

Referring to FIGS. 3-5, the method of using the inflatable bag of the present invention includes the following steps:

Step 1: Extend out the inflatable outer bag 4 to prevent the plural airflow passages (410,420,430) from bending and affecting the inflation work.

Step 2: The user pushes the thumbtack 22 of the hole-piercing device 2 in the positioning hole 2110 on the top wall 211 of the bottle cap 21 toward the bottle mouth 10 of the gas cylinder 1 to pierce the sealing film, allowing the compressed gas to discharge from the gas cylinder 1 through the hole pierced on the sealing film by the thumbtack 22 of the bottle cap 21, so that the discharged gas flows through the air holes 30 of the inner bag 3 into the first air chamber 41 of the inflatable outer bag 4. When the first air chamber 41 is fully inflated, the discharge gas flows from the first air chamber 41 through the first airflow passage 410 into the second air chamber 42. When the second air chamber 42 is fully inflated, the discharge gas flows from the second air chamber 42 through the second airflow passage 420 into the third air chamber 43. When the third air chamber 43 is fully inflated, the discharge gas flows from the third air chamber 43 through the third airflow passage 430 into the fourth air chamber 44. When the first, second, third, and fourth air chambers 41~44 are fully inflated, the inflatable outer bag 4 is in the inflated use status.

Step 3: The user places the inflatable outer bag 4 in the space in a box around the object to be protected (for example: computer graphics card, computer memory, hard disk drive and wireless network sharer and other related computer components) to form a filling buffer, and then additionally fills the box with a gas to form a better protection structure. Thus, the packing operation is completed.

It can be understood that the present invention provides an inflatable bag, as disclosed in FIGS. 1-6, which comprises a gas cylinder that is filled with a compressed gas and has a bottle neck and a bottle mouth defined in the bottle neck and sealed and openable for discharging the compressed gas, a hole-piercing device mounted on the gas cylinder to face the bottle mouth and pressable to pierce into the bottle mouth for letting the compressed gas be discharged out of the gas cylinder, an inner bag that surrounds the gas cylinder and the hole-piercing device and has at least one air hole for the passing of the compressed gas being discharged out of the gas cylinder, and an inflatable outer bag that surrounds the inner bag and is inflatable by the compressed gas that is discharged out of the gas cylinder and flows through the at least one air hole of the inner bag. The inflatable bag is practical for use in a box to protect an object and can be quickly inflated to form a filling buffer without generating heat, ensuring that the protected object is not easily deteriorated and facilitating recycling and cleaning.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An inflatable bag, comprising:

a gas cylinder filled with a compressed gas, said gas cylinder comprising a bottle neck and a bottle mouth defined in said bottle neck and sealed and operable for discharging said compressed gas;

a hole-piercing device mounted on said gas cylinder to face said bottle mouth and pressable to pierce into said bottle mouth for letting said compressed gas be discharged out of said gas cylinder;

an inner bag surrounding said gas cylinder and said hole-piercing device, said inner bag having at least one air hole for the passing of the said compressed gas being discharged out of said gas cylinder; and an inflatable outer bag surrounding said inner bag and inflatable by the said compressed gas that is discharged out of said gas cylinder and flows through said at least one air hole of said inner bag.

2. The inflatable bag as claimed in claim 1, wherein said hole-piercing device comprises a bottle cap covering said bottle neck of said gas cylinder, said bottle cap comprising a housing space for receiving said bottle neck and a positioning hole located on a top wall thereof and disposed in communication with said housing space, and a thumbtack mounted in said positioning hole of said bottle cap and aimed at said bottle mouth of said gas cylinder.

3. The inflatable bag as claimed in claim 1, wherein said inflatable outer bag comprises a plurality of division lines formed by high frequency heat sealing, a plurality of air chambers separated from one another by said division lines, and a plurality of airflow passages set between said air chambers.

4. The inflatable bag as claimed in claim 1, wherein said compressed gas of said gas cylinder is composed of 24 grams of carbon dioxide ($CO_2$); said bottle mouth of said gas cylinder is sealed with a film.

5. The inflatable bag as claimed in claim 1, wherein the length and width of said inner bag are 200 mm*80 mm, and the number of said at least one air hole is 14 that are arranged in an array of 2*7 on said inner bag and have a diameter ranging from 0.5 to 1.5 mm.

6. The inflatable bag as claimed in claim 1, wherein said inner bag is composed of a composite material of polyethylene terephthalate and polyethylene with a thickness of 0.22 mm.

7. The inflatable bag as claimed in claim 1, wherein said inflatable outer bag is composed of a nylon coextruded film with a thickness of 0.15 mm.

* * * * *